(12) United States Patent
Zhong

(10) Patent No.: US 12,320,419 B1
(45) Date of Patent: Jun. 3, 2025

(54) ELASTIC BUFFERING PLANET CARRIER AND SPEED REDUCER

(71) Applicant: Wen Zhong, Guangdong (CN)

(72) Inventor: Wen Zhong, Guangdong (CN)

(*) Notice: Subject to any disclaimer, the term of this patent is extended or adjusted under 35 U.S.C. 154(b) by 0 days.

(21) Appl. No.: 18/983,448

(22) Filed: Dec. 17, 2024

(30) Foreign Application Priority Data

Oct. 24, 2024 (CN) .......................... 202411492130.1

(51) Int. Cl.
| | | |
|---|---|---|
| *F16H 57/08* | (2006.01) | |
| *F16H 1/32* | (2006.01) | |
| *F16H 1/28* | (2006.01) | |

(52) U.S. Cl.
CPC ............. *F16H 57/082* (2013.01); *F16H 1/32* (2013.01); *F16H 1/2836* (2013.01)

(58) Field of Classification Search
CPC .... F16H 1/2836; F16H 57/082; F16H 1/2863; F16H 1/2818
USPC ........................................................ 475/347
See application file for complete search history.

(56) References Cited

U.S. PATENT DOCUMENTS

| | | | | |
|---|---|---|---|---|
| 2,971,407 | A * | 2/1961 | Katz ..................... | F16H 1/2836 74/411 |
| 5,098,359 | A * | 3/1992 | Chales ................. | B60N 2/2251 475/349 |
| 8,172,717 | B2 * | 5/2012 | Lopez ................... | F16H 57/082 475/346 |
| 8,398,525 | B2 * | 3/2013 | Matsuoka ................. | F02C 7/36 475/331 |
| 8,550,957 | B2 * | 10/2013 | Erno ..................... | F16H 1/2836 475/331 |
| 8,986,160 | B2 * | 3/2015 | Altamura .................. | F16H 1/28 475/347 |
| 10,495,182 | B2 * | 12/2019 | Nayak ....................... | F02C 7/32 |
| 11,015,682 | B2 * | 5/2021 | Vasilev ................. | F16H 57/021 |
| 11,401,998 | B2 * | 8/2022 | Takizawa ................. | F16H 1/46 |
| 12,092,190 | B2 * | 9/2024 | Ling ...................... | F16H 57/082 |
| 2024/0229925 | A1 * | 7/2024 | Yang ..................... | F16H 1/2863 |

FOREIGN PATENT DOCUMENTS

| | | | | |
|---|---|---|---|---|
| CN | 105156594 | A | * | 12/2015 |
| CN | 114635960 | A | * | 6/2022 |
| DE | 3701729 | A1 | * | 8/1988 |
| FR | 2644859 | A1 | * | 9/1990 |
| GB | 691776 | A | * | 5/1953 |
| GB | 1275890 | A | * | 5/1972 |
| JP | H08170695 | A | * | 7/1996 |
| WO | WO-2019048568 | A1 | * | 3/2019 ........... F16H 1/2836 |

* cited by examiner

*Primary Examiner* — Sherry L Estremsky
(74) *Attorney, Agent, or Firm* — Cooper Legal Group, LLC

(57) ABSTRACT

A speed reducer including at least one elastic buffering planet carrier and an elastic buffering planet carrier include a fixed bracket and an encircling elastic buffering device, where the fixed bracket is mounted inside the encircling elastic buffering device, the fixed bracket is configured with at least one central shaft hole for guiding an output shaft to axially pass through, a plurality of shaft holes of planetary gear are evenly distributed at the encircling elastic buffering device, the plurality of shaft holes of planetary gear are configured for gear shafts to respectively pass through, and the encircling elastic buffering device is elastically deformable in a transverse direction, a longitudinal direction and arbitrary oblique direction.

5 Claims, 10 Drawing Sheets

ELASTIC BUFFERING PLANET CARRIER AND SPEED REDUCER

CROSS-REFERENCE TO RELATED APPLICATION

The present application is based on and claims the priority benefits of China application No. 202411492130.1, filed on Oct. 24, 2024. The entirety of China application No. 202411492130.1 is hereby incorporated by reference herein and made a part of this specification.

TECHNICAL FIELD

The present application relates to the field of speed reducer, and, in particular, to an elastic buffering planet carrier and a speed reducer.

BACKGROUND ART

In the field of mechanical transmission, the speed reducer, as a key component to reduce an input rotation speed and provide an appropriate output rotation speed, plays a significant role. It is widely used in industrial production, automation equipment, transportation and many accuracy transmission fields, such as chip manufacturing, medical equipment, military equipment and diamond polishing.

However, in the design of a planetary reducer in the existing technique, although a rigid connection structure may be used to ensure a stable fit among the gears, the phenomenon of uneven stress of the planetary gears often occurs in the actual working process due to machining and assembly errors of gears, that is, a so-called "unbalance loading". Due to unbalance loading, not only the working efficiency of the speed reducer may be reduced, but also overload fracture of gears may be caused, which seriously affects the reliability and service life of the equipment while increasing the maintenance cost.

Especially in the field of accuracy transmission, such as chip manufacturing, medical equipment and military equipment, there are extremely high requirements for accuracy (small backlash), stability and reliability of the speed reducer. In these fields, minor errors may lead to the performance degradation or even failure of the whole system.

SUMMARY

An objective of the present application is to overcome the above-described technical problems and provide an elastic buffering planet carrier and a speed reducer.

The elastic buffering planet carrier provided by the present application includes a fixed bracket and an encircling elastic buffering device, where the fixed bracket is mounted inside the encircling elastic buffering device, the fixed bracket is configured with at least one central shaft hole for guiding an output shaft to axially pass through, a plurality of shaft holes of planetary gear are evenly distributed at the encircling elastic buffering device, the plurality of shaft holes of planetary gear are configured for gear shafts to respectively pass through, and the encircling elastic buffering device is elastically deformable in a transverse direction, a longitudinal direction and arbitrary oblique direction.

The elastic buffering planet carrier according to the above technical solution may effectively reduce and weaken the assembly and operation errors among gears, so as to ensure a clearance-free transmission between two adjacent gears, thereby avoiding the unbalance loading phenomenon caused by the machining and assembly errors of the gears in the traditional planetary reducer, and thus improving the reliability and service life of the speed reducer. The elastic buffering planet carrier is used to realize stable meshing among a plurality of gears and ensure that there is no gap between adjacent gears, thereby achieving the objective of clearance-free transmission, so as to reduce transmission backlash, and thus effectively improving the reliability and service life of the speed reducer. Compared with a rigid planet carrier, the elastic buffering planet carrier shows greater flexibility in machining requirements, which not only improves the overall machining efficiency, but also reduces the demand for machining accuracy of the planet carrier, thus reducing the overall machining cost of the planet carrier. By means of the elastic buffering planet carrier, not only the requirements of parts accuracy and assembly accuracy is reduced, but also the overall transmission accuracy and meshing accuracy are improved.

Alternatively, the encircling elastic buffering device includes a plurality of elastic buffering units, every two adjacent elastic buffering units of the plurality of elastic buffering units are fixedly connected by a connection bridge, the fixed bracket is fixedly connected with the plurality of connection bridges simultaneously, and each of the plurality of elastic buffering units is elastically deformable in the transverse direction, the longitudinal direction and arbitrary oblique direction.

The encircling elastic buffering device according to the above technical solution includes a plurality of elastic buffering units, and every two adjacent elastic buffering units are fixedly connected by a connection bridge, the fixed bracket is fixedly connected with the plurality of connection bridges, so that each elastic buffering unit may exhibit a good elastic deformation ability in the transverse direction, the longitudinal direction and arbitrary oblique direction to more effectively reduce and weaken assembly and operation errors among gears.

Alternatively, each of the plurality of elastic buffering units includes a movable support and two elastic connecting arms, the movable support is positioned between the two elastic connecting arms, a first end of each of the two elastic connecting arms is fixedly connected to the connection bridge, a second end of each of the two elastic connecting arms is tightly fixed to one end of the movable support, the two elastic connecting arms are flexibly bendable in the transverse direction, the longitudinal direction and arbitrary oblique direction, and the plurality of shaft holes of planetary gear are configured at the movable support.

According to the technical solution, each of the elastic buffering units includes a movable support and two elastic connecting arms, the movable support is positioned between the two elastic connecting arms, one end of each elastic connecting arm is fixedly connected to the connection bridge while the other end thereof is tightly fixed to one end of the movable support, the elastic connecting arms may flexibly bend in the transverse direction, the longitudinal direction and arbitrary oblique direction, and the shaft holes of planetary gear are directly defined at the movable support, so as to ensure the clearance-free transmission between two adjacent gears, so that the elastic buffering unit may effectively reduce and weaken the assembly and operation errors among the gears, thereby improving the stability and reliability of the planetary gear transmission.

Alternatively, each of the two elastic connecting arms is of an arc-shaped structure or a U-shaped structure or an S-shaped structure or a V-shaped structure or a C-shaped structure.

In the above technical solution, the arc-shaped structure or the U-shaped structure or the S-shaped structure or the V-shaped structure or the C-shaped structure has better elasticity and toughness, and may adapt to the force and displacement changes in different directions, thereby more effectively alleviating the unbalance loading problem caused by the machining and assembly errors of the gears.

Alternatively, each of the two elastic connecting arms includes a first bent section, a second bent section and a third bent section, a first end of the first bent section is connected to the connection bridge, a second end of the first bent section is connected to a first end of the second bent section, a second end of the second bent section is connected to a first end of the third bent section, and a second end of the third bent section is connected to the movable support. Such a design ensures the flexible bendability in multidirection of the elastic connecting arms.

According to the above technical solution, the elastic connecting arm is divided into the first bent section, the second bent section and the third bent section, which ensures the flexible bendability of the elastic connecting arm in the transverse direction, the longitudinal direction and arbitrary oblique direction, thereby improving the ability of the elastic buffering planet carrier to reduce and weaken the assembly and operation errors among gears.

Alternatively, at least one of the first bent section, the second bent section, or the third bent section is of an arc-shaped structure or a U-shaped structure or an S-shaped structure or a V-shaped structure or a C-shaped structure.

In the above technical solution, when the first bent section, the second bent section and the third bent section of the elastic connecting arm are all designed as the arc-shaped structure, the U-shaped structure or the S-shaped structure, the elastic deformation potential of the elastic connecting arm in the transverse direction, the longitudinal direction and arbitrary oblique direction may be maximized, thereby ensuring the clearance-free transmission between two adjacent gears, such that assembly and operation errors among the gears may be effectively reduced and weakened, thereby ensuring the stable operation of the planetary gear system.

Alternatively, the fixed bracket includes a fixed block and a plurality of connecting blocks, the at least one central shaft hole is configured at the fixed block, the plurality of connecting blocks are distributed in a circumferential direction of the fixed block, a first end of each of the plurality of connecting blocks is fixedly connected to the fixed block, and a second end of each of the plurality of connecting blocks is fixedly connected to the connection bridge.

According to the technical solution, the fixed bracket includes a fixed block and a plurality of connecting blocks, the central shaft hole is defined in the fixed block, the connecting blocks are distributed in the circumferential direction of the fixed block and connected with the fixed block and the connection bridge, so that the fixed bracket and the encircling elastic buffering device form a stable structure, which improves the structural stability and overall reliability of the elastic buffering planet carrier.

Alternatively, the fixed block, every two adjacent connecting blocks of the plurality of connecting blocks and a respective one of the plurality of elastic buffering units together form a space region allowing an elastic deformation of the respective one of the plurality of elastic buffering units.

According to the above technical solution, the fixed block, every two adjacent connecting blocks and the elastic buffering unit together form a space region that allows the elastic buffering unit to undergo an elastic deformation, thereby ensuring that the elastic buffering unit may effectively reduce and weaken the assembly and operation errors among the gears, and thus improving the stability and damping effect of the entire planet carrier structure.

A speed reducer includes a housing, at least one above elastic buffering planet carrier and at least one planetary gear system, where a ring gear is provided inside the housing, the at least one elastic buffering planet carrier is provided inside the housing, the at least one elastic buffering planet carrier is fixedly connected with other parts of the speed reducer, the at least one planetary gear system is fixedly connected or rotatably connected with a power input component of the speed reducer, and the at least one planetary gear system and the ring gear are linked with each other.

By adopting the above technical solution, the elastic buffering planet carrier may effectively reduce and weaken the unbalance loading phenomenon caused by machining errors, assembly errors of gears and tiny vibration during operation. Such buffering effect enables the planetary gears to maintain a more stable meshing state during the transmission, so as to ensure the clearance-free transmission between two adjacent gears, thereby improving the stability and reliability of the transmission, reducing the wear speed of the gears, and thus prolonging the service life of the gears. An interlinkage design of the planetary gear system and the ring gear optimizes the transmission path and improves the energy transmission efficiency.

Alternatively, elastic grooves are defined between the ring gear and the housing, and each of the elastic grooves is configured to be open at two ends of each of the elastic grooves along an axis of the housing to ensure that the ring gear is elastically deformable during operation.

According to the above technical solution, elastic grooves are defined between the ring gear and the housing, and each elastic groove is open at two ends thereof along the axis of the housing to ensure that the ring gear may be elastically deformed during operation, thereby further reducing and weakening the assembly and operation errors among the gears, which improves the operation stability and reliability of the speed reducer.

In summary, the present application includes at least one of the following beneficial technical effect.

1. The encircling elastic buffering device of the present application may undergo an effective elastic deformation in transverse, longitudinal and arbitrary oblique direction, so as to ensure the clearance-free transmission between two adjacent gears, thereby reducing and weakening assembly and operation errors among gears, which solves the unbalance loading problem caused by machining and assembly errors of gears.

2. The flexible bendability of the elastic connecting arm in the elastic buffering unit in the transverse direction, the longitudinal direction and arbitrary oblique direction enables the planetary gear to be uniformly stressed in the working process, which avoids the occurrence of overload fracture of a single gear.

3. Through the design of the elastic buffering planet carrier, the overall structure of the speed reducer is more compact, the volume and weight are reduced, and the service life and working efficiency of the equipment are improved.

DETAILED DESCRIPTION

The present application is described in further detail below referring to FIGS. 1-10.

The terminology used herein is for the objective of describing embodiments only, and is not intended to limit the present application. Unless otherwise defined, technical terms or scientific terms used herein shall have the usual meaning understood by a person skilled in the art to which the present application belongs. The use of the terms "first", "second", and the like in the present application does not denote any order, quantity, or importance, but rather is used to distinguish one element from another.

Embodiment 1

Figure 1:
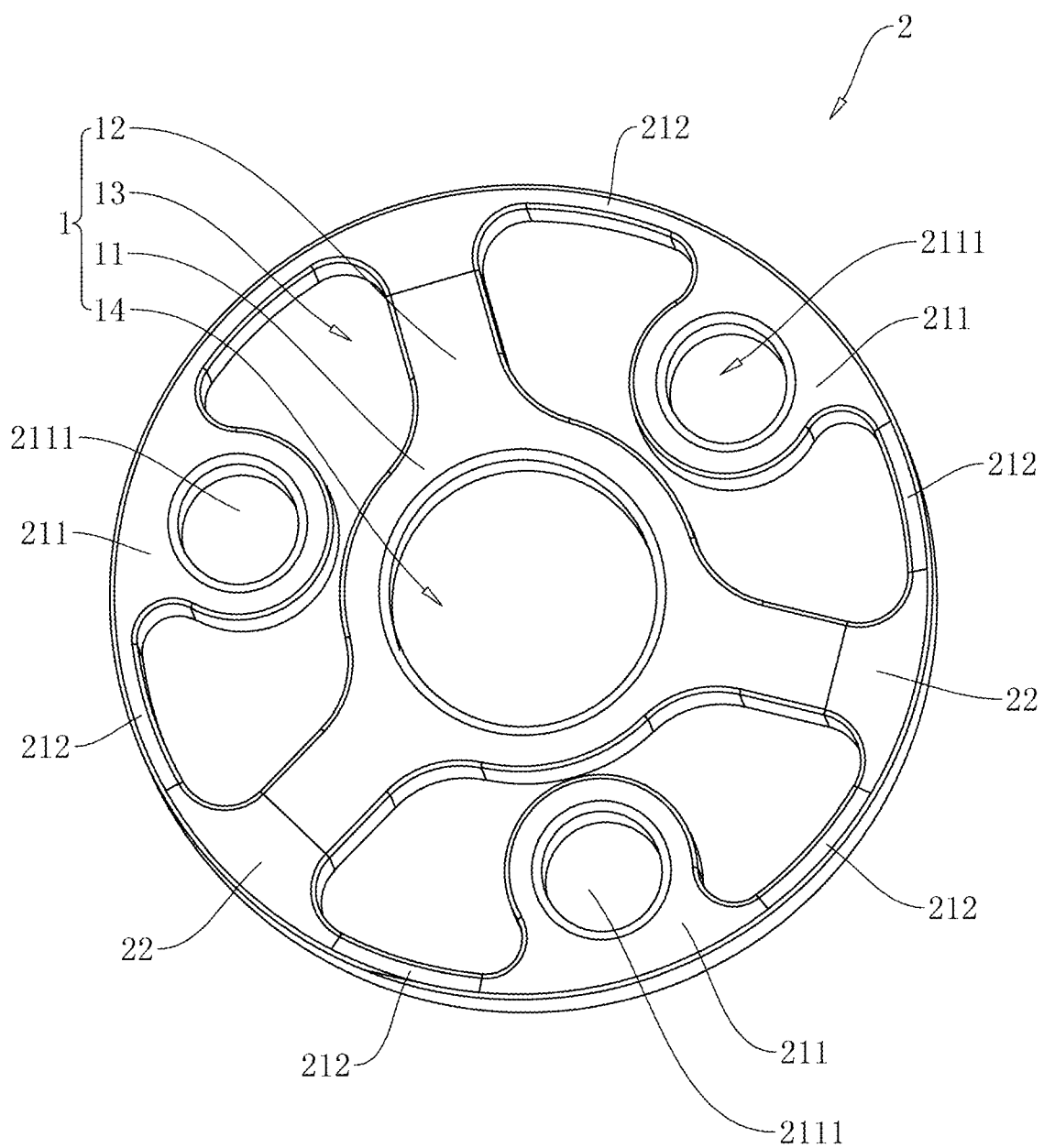
FIG. 1 is a schematic view showing the structure of an elastic buffering planet carrier according to Embodiment 1 of the present application.

The elastic buffering planet carrier provided in the present embodiment is suitable for a planetary reducer, a harmonic speed reducer, or other similar speed reducing structures. Referring to FIG. 1, the elastic buffering planet carrier includes a fixed bracket 1 and an encircling elastic buffering device 2, where the fixed bracket 1 is mounted in the internal central region of the encircling elastic buffering device 2, and the fixed bracket 1 is configured with at least one central shaft hole 14. One central shaft hole 14 is provided, and the central shaft hole 14 is located at the center of the fixed bracket 1. The central shaft hole 14 is configured to guide the output shaft 4 of the speed reducer therethrough. Three shaft holes of planetary gear 2111 are evenly distributed at the encircling elastic buffering device 2, and the shaft hole of planetary gear 2111 is configured to guide the gear shaft therethrough. The encircling elastic buffering device 2 may effectively and elastically deform in the transverse direction, the longitudinal direction and arbitrary oblique direction to reduce and weaken the assembly and operation errors among the gears, thus ensuring the clearance-free transmission between two adjacent gears.

Specifically, the fixed bracket 1 includes a fixed block 11 and a plurality of connecting blocks 12. Three connecting blocks 12 are provided, the three connecting blocks 12 are evenly distributed along the circumferential direction of the fixed block 11, one end of each connecting block 12 is integrally formed with the fixed block 11, and the other end of each connecting block 12 is integrally formed with the connection bridge 22. The fixed block 11 may be made of high-strength steel, which has good mechanical properties and wear resistance. The width of the connecting block 12 may be adjusted according to actual needs to enhance the stability of the overall structure.

The encircling elastic buffering device 2 includes a plurality of elastic buffering units 21, and three elastic buffering units 21 are provided here. Two adjacent elastic buffering units 21 are fixedly connected by a connection bridge 22. Each of the elastic buffering units 21 may exhibit a good elastic deformability in the transverse direction, the longitudinal direction and any oblique directions. Each elastic buffering unit 21 includes a movable support 211 and two elastic connecting arms 212, and the movable support 211 is positioned between the two elastic connecting arms 212. One end of each elastic connecting arm 212 is integrally formed with the connection bridge 22, and the other end thereof is integrally formed with one end of the movable support 211. The elastic connecting arm 212 is flexibly bendable in the transverse direction, the longitudinal direction and any oblique directions, and the shaft hole of planetary gear 2111 is directly defined at the center of the movable support 211.

The elastic connecting arm 212 is arc-shaped or U-shaped or S-shaped or V-shaped or C-shaped. The arc-shaped structure or the U-shaped structure or the S-shaped structure or the V-shaped structure or the C-shaped structure has better elasticity and toughness, and may adapt to the force and displacement changes in different directions, thereby more effectively alleviating the unbalance loading caused by the machining and assembly errors of the gear.

The implementation principle of the present embodiment is as follows. The elastic buffering planet carrier includes a fixed bracket 1 and an encircling elastic buffering device 2, where the elastic connecting arm 212 of an arc or similar structure in the elastic buffering unit 21 may ensure the clearance-free transmission between two adjacent gears, which are flexibly bendable in multidirection to reduce and weaken the assembly and operation errors among gears, thereby improving the overall performance and service life of the planetary reducer.

Embodiment 2

Figure 2:
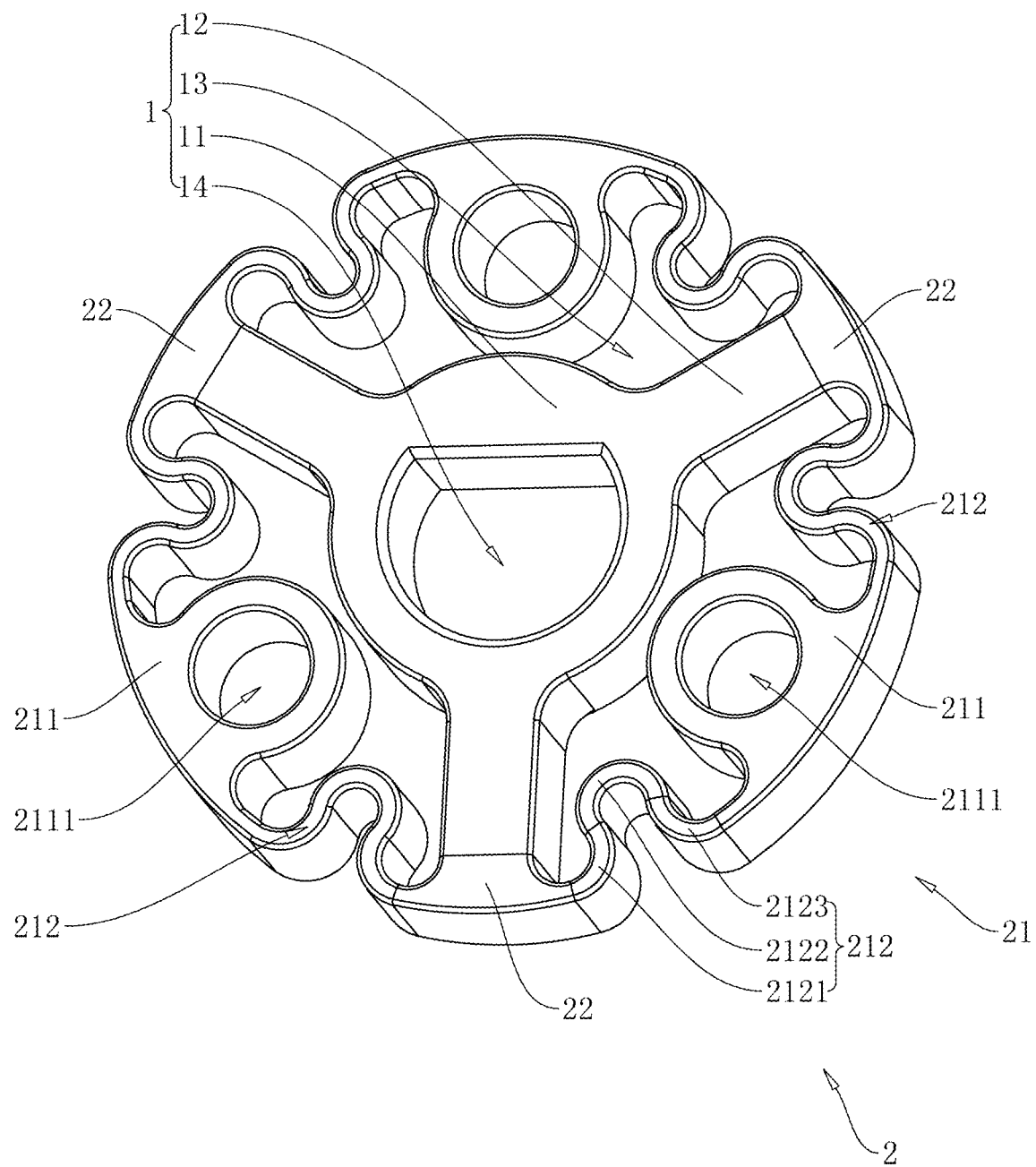
FIG. 2 is a schematic view showing the structure of an elastic buffering planet carrier according to Embodiment 2 of the present application.
Figure 3:
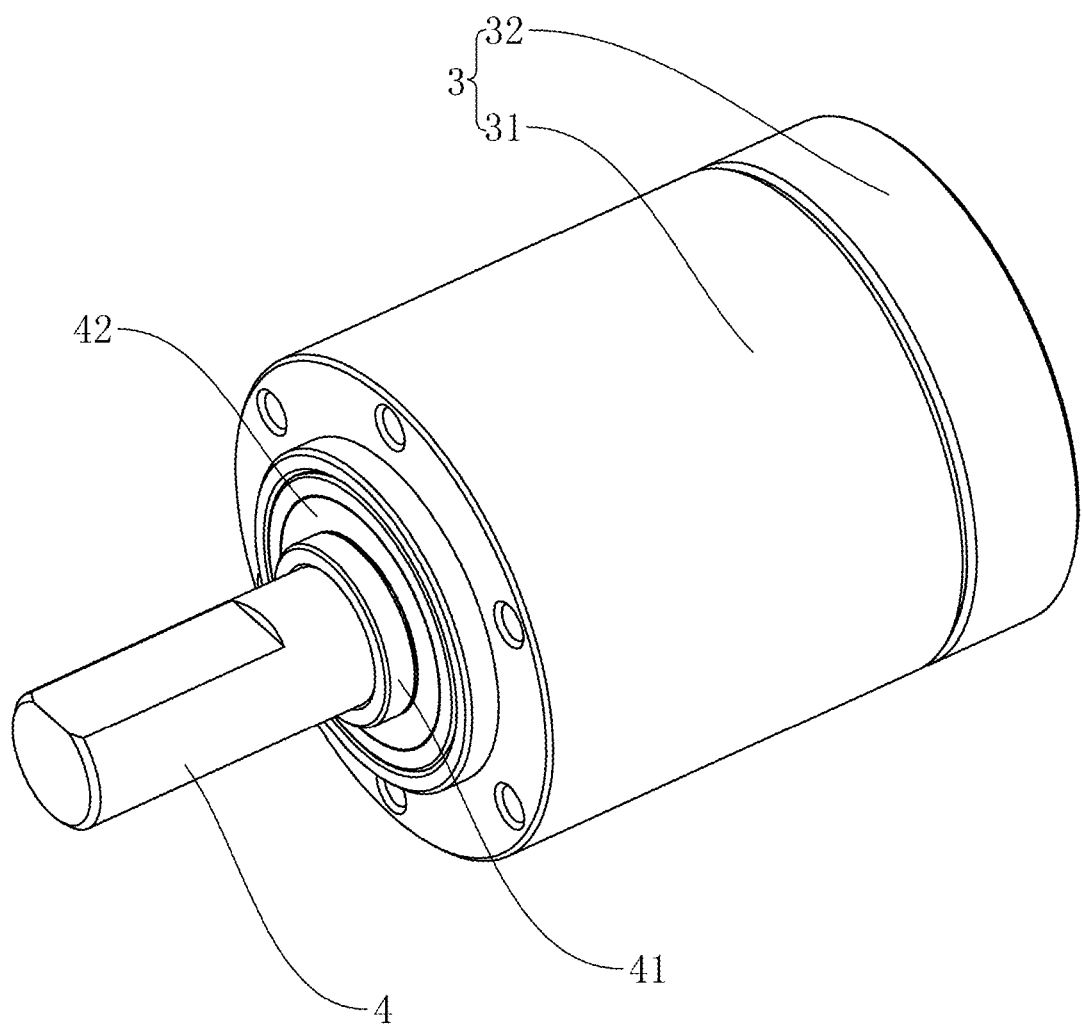
FIG. 3 is a schematic view showing the structure of a speed reducer according to Embodiment 3 of the present application.

Referring to FIG. 2, the present embodiment is different from Embodiment 1 in that the elastic connecting arm 212 is further divided into a first bent section 2121, a second bent section 2122 and a third bent section 2123, where one end of the first bent section 2121 is integrally formed with the connection bridge 22 while the other end of the first bent section 2121 is integrally formed with one end of the second bent section 2122, the other end of the second bent section 2122 is integrally formed with one end of the third bent section 2123, and the other end of the third bent section 2123 is integrally formed with the movable support 211. This ensures the flexible bendability of the elastic connecting arm 212 in multidirection. The first bent section 2121, the second bent section 2122, and the third bent section 2123 are each preferably of an arc-shaped structure. The arc-shaped structure or C-shaped structure may be specifically in the form of major arc or inferior arc to meet the deformation requirements under different conditions.

At least one of the first bent section 2121, the second bent section 2122, or the third bent section 2123 is of an arc-shaped structure, a U-shaped structure, an S-shaped structure, a V-shaped structure, or a C-shaped structure. When the first bent section 2121, the second bent section 2122 and the third bent section 2123 of the elastic connecting arm 212 are all designed as the arc-shaped structure, the U-shaped structure or the S-shaped structure, the elastic deformation potential of the elastic connecting arm in the transverse direction, the longitudinal direction and arbitrary oblique direction may be maximized, thereby ensuring the clearance-free transmission between two adjacent gears, effectively reducing and weakening assembly and operation errors among the gears, so as to ensure a stable operation of the planetary gear system.

The fixed block 11, the two adjacent connecting blocks 12 and the elastic buffering unit 21 together form a space region 13 that allows the elastic buffering unit 21 to be elastically deformed, ensuring that the elastic buffering unit 21 will not be interfered during the deformation in multidirection, and taking maximum advantage of its elastic buffering effect. The number of the elastic buffering units 21 may be six or more.

The implementation principle of the present embodiment is as follows. The elastic connecting arm 212 is divided into the first bent section 2121, the second bent section 2122, and the third bent section 2123, which are preferably of arc-shaped or other elastic structures, so as to enhance the flexible bendability of the elastic connecting arm 212 in multidirection, thereby better reducing and weakening assembly and operation errors among gears. The space region formed by the fixed block 11, the connecting blocks 12 and the elastic buffering unit 21 ensures the freedom of multi-directional deformation of the elastic buffering unit 21.

Embodiment 3

The present embodiment provides a speed reducer, referring to FIGS. 3, 4, 5 and 6, the speed reducer includes a housing 3, an output shaft 4, a ring gear 5, at least one elastic buffering planet carrier as described in Embodiment 1 or Embodiment 2, and at least one planetary gear system 6, and the number of the elastic buffering planet carrier and that of the planetary gear system 6 correspond one to one. Specifically, the housing 3 includes a mounting cylinder 31 and a cover 32, the mounting cylinder 31 is of an integral structure, and the cover 32 is detachably connected to one end of the mounting cylinder 31. The cover 32 is screwed to the mounting cylinder 31, which increases the convenience of mounting and removal of the cover 32 by a worker.

The elastically buffering planet carrier is arranged inside the mounting cylinder 31, and the elastic buffering planet carrier is fixedly connected with the housing 3 or other parts of the speed reducer. One end of the mounting cylinder 31 away from the cover 32 is configured with a bore 33, a ball bearing 42 is provided in the bore 33, and the output shaft 4 passes through the bore 33 and is rotatably connected with the mounting cylinder 31 through the ball bearing 42. A fixing sleeve 41 is further fixed on a periphery of the output shaft 4, and an end of the fixing sleeve 41 abuts against an end of the ball bearing 42, so that the ball bearing 42 is conveniently prevented from moving in the axial direction of the output shaft 4, thereby increasing the mounting firmness of the ball bearing 42. The number of the fixing sleeves 41 and the ball bearings 42 may be one, two, or three.

A corrugated gasket 43 is further sleeved on the output shaft 4, and the corrugated gasket 43 is positioned between two adjacent ball bearings 42. The corrugated gasket 43 sleeved on the output shaft 4 plays a significant role between two adjacent ball bearings 42, which significantly improves the overall performance and reliability of the transmission system by providing axial positioning, pre-tightening, load dispersion, improving sealing performance, etc.

Two elastic buffering planet carriers and two planetary gear systems 6 are provided, and the two elastic buffering planet carriers and the two planetary gear systems 6 are both provided inside the mounting cylinder 31.

Each elastic buffering planet carrier includes a fixed bracket 1 and an encircling elastic buffering device 2, and the fixed bracket 1 is mounted in the internal central region of the encircling elastic buffering device 2. The specific structures of the fixed bracket 1 and the encircling elastic buffering device 2 are the same as those of Embodiment 1, and will not be repeatedly described here. The fixed bracket 1 is configured with a central shaft hole 14, and one end of the output shaft 4 located inside the mounting cylinder 31 passes through the central shaft hole 14. The fixed bracket 1 is sleeved on the output shaft 4 and fixedly connected to the output shaft 4, so as to fix one of the elastic buffering planet carriers to the end of the output shaft 4.

One of the planetary gear systems 6 is arranged on the above-described elastically buffering carrier and includes a first sun gear 61, three first planetary gears 62, and three first gear shafts 63. Since the three movable supports 211 of the encircling elastic buffering device 2 are all configured with the shaft holes of planetary gear 2111, the first gear shafts 63 correspond to the shaft holes of planetary gear 2111 and the first planetary gears 62 one to one. One end of each of the first gear shafts 63 passes through the shaft hole of planetary gear 2111 and is fixedly connected to the elastic buffering planet carrier. Each first planetary gear 62 is sleeved on the other end of a corresponding first gear shaft 63 and is fixedly connected with the first gear shaft 63. The first sun gear 61 is rotationally arranged among the three first planetary gears 62 and meshes with the three first planetary gears 62 to achieve a rotational movement. Each of the three first planetary gears 62 meshes with the ring gear 5 to form one of the planetary gear systems.

The end of the first sun gear 61 is fixedly provided with a connecting shaft 64, and the other elastic buffering planet carrier is sleeved on the connecting shaft 64 and fixedly connected with the connecting shaft 64. An annular gasket of sun gear 7 is further sleeved on the connecting shaft 64, and the annular gasket of sun gear 7 is positioned between the first sun gear 61 and the elastic buffering planet carrier. The other planetary gear system 6 includes a second sun gear 65, three second planetary gears 66 and three second gear shafts 67. Since the three movable supports 211 of the encircling elastic buffering device 2 are configured with shaft holes of planetary gear 2111, the second gear shafts 67 correspond to the shaft holes of planetary gear 2111 and the second planetary gears 66 in this elastic buffering planet carrier one to one. One end of each of the second gear shafts 67 passes through the shaft hole of planetary gear 2111 and is fixedly connected to the elastic buffering planet carrier. Each second planetary gear 66 is sleeved on the other end of the second gear shaft 67 and is fixedly connected to the second gear shaft 67. The second sun gear 65 is rotationally arranged among the three second planetary gears 66 and meshes with the three second planetary gears 66 to achieve a rotational movement. The three second planetary gears 66 and the ring gear 5 mesh with each other to form a planetary gear system.

Figure 4:
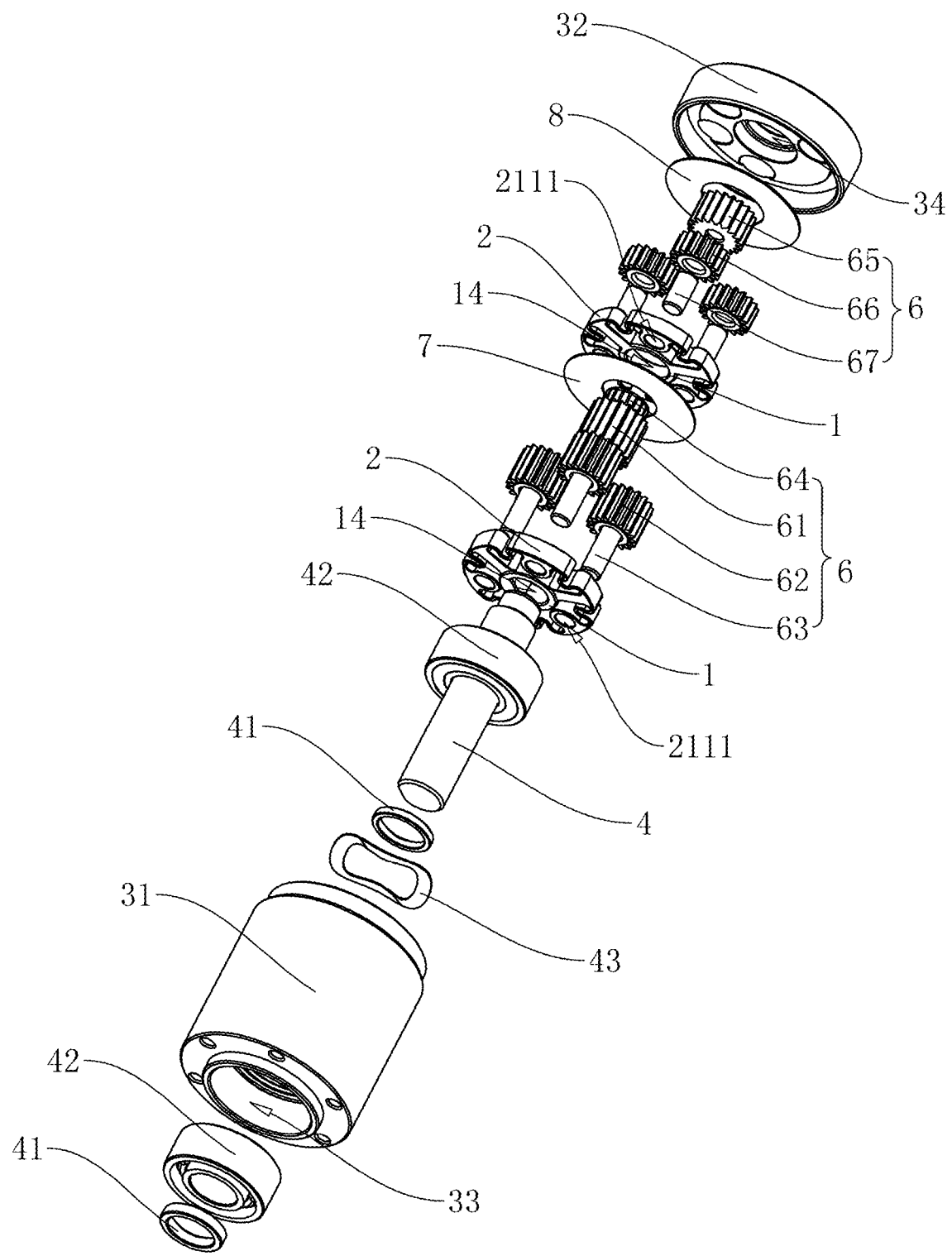
FIG. 4 is a schematic view showing the assembly relationship of the speed reducer according to Embodiment 3 of the present application.
Figure 5:
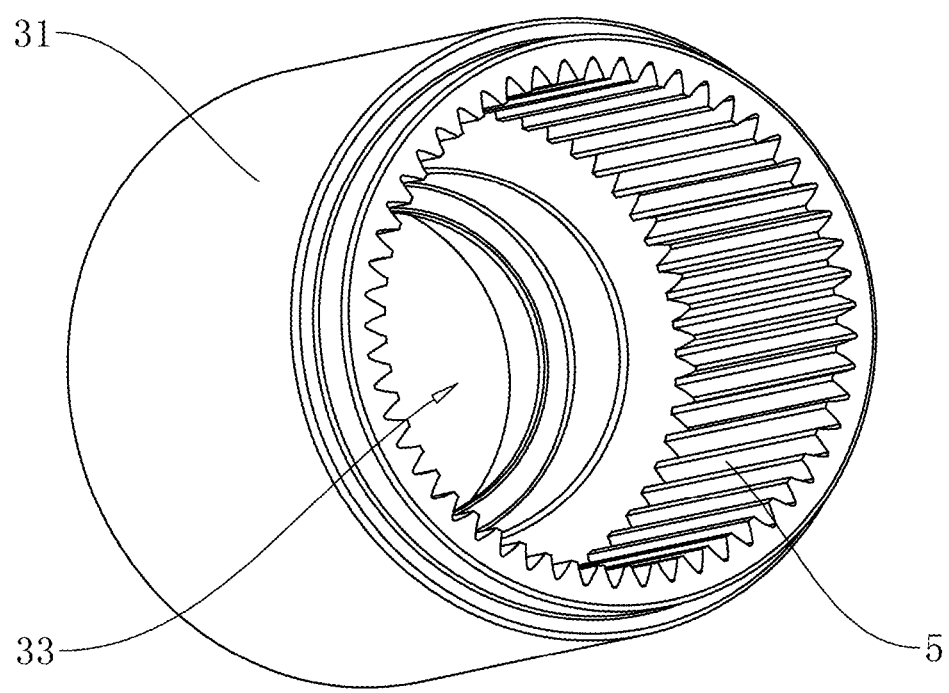
FIG. 5 is a schematic view showing the structure of a mounting cylinder from another perspective according to Embodiment 3 of the present application.

Referring to FIG. 4, an annular gasket of cover 8 is provided between the planetary gear system 6 and the cover 32. A through hole 34 through which the shaft of the motor passes is defined at the center of the cover 32. One of the planetary gear systems 6 is driven to run by the motor, so as to drive the other planetary gear system 6 to run, and finally to drive the output shaft 4 of the speed reducer to rotate.

The two planetary gear systems 6 may be independently configured with different reduction ratios respectively to realize the multi-stage reduction function, which effectively improves the flexibility and application range of the speed reducer.

Since both the planet carrier and the ring gear have elastic buffering functions, the planetary reducer may alleviate the impact of the speed reducer on the operation performance of the whole machine, such as stability, noise, efficiency and life, due to errors caused by the manufacturing and assembly of parts. In addition, if a reasonable amount of interference is pre-added between the sun gear, planetary gear, and ring gear, a backlash-free transmission (zero backlash transmission) may be achieved by the planetary reducer to achieve the effect of accurate transmission. Additionally, the problem that in the planet reducer industry, the smaller the backlash, the higher the part accuracy and the higher the cost is also solved.

Of course, the elastic buffering planet carrier is also applicable to an elastic buffering structure of the rigid wheel of the harmonic speed reducer, so that a smaller backlash and a smoother and more accurate transmission may be achieved by the harmonic speed reducer with the same size, and that zero backlash may also be achieved when a suitable amount of interference is pre-added between the flexible wheel and the rigid wheel. Of course, the elastic buffering planet carrier has the same effect when applied to other speed reducer structures.

The implementation principle of the present embodiment is as follows. The elastic buffering planet carrier and the planetary gear system are integrated into a speed reducer, where the elastic buffering planet carrier may effectively reduce and weaken the assembly and operation errors among the gears, thereby ensuring a clearance-free transmission between two adjacent gears, thereby avoiding the unbalance loading phenomenon caused by the machining and the assembly errors of the gears in the traditional planetary reducer, and improving the reliability and service life of the speed reducer.

Embodiment 4

Figure 6:
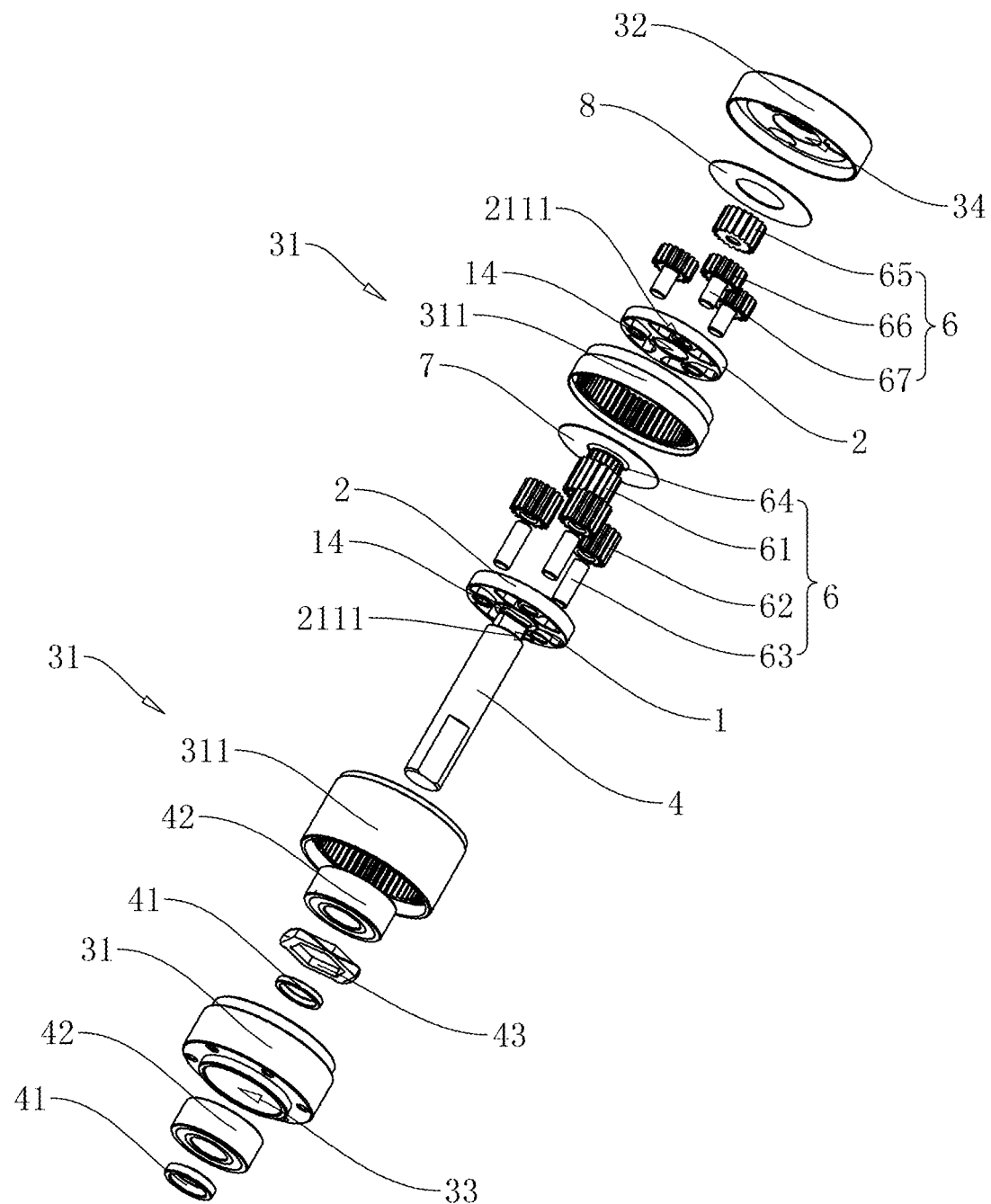
FIG. 6 is a schematic view showing the assembly relationship of another speed reducer according to Embodiment 3 of the present application.
Figure 7:
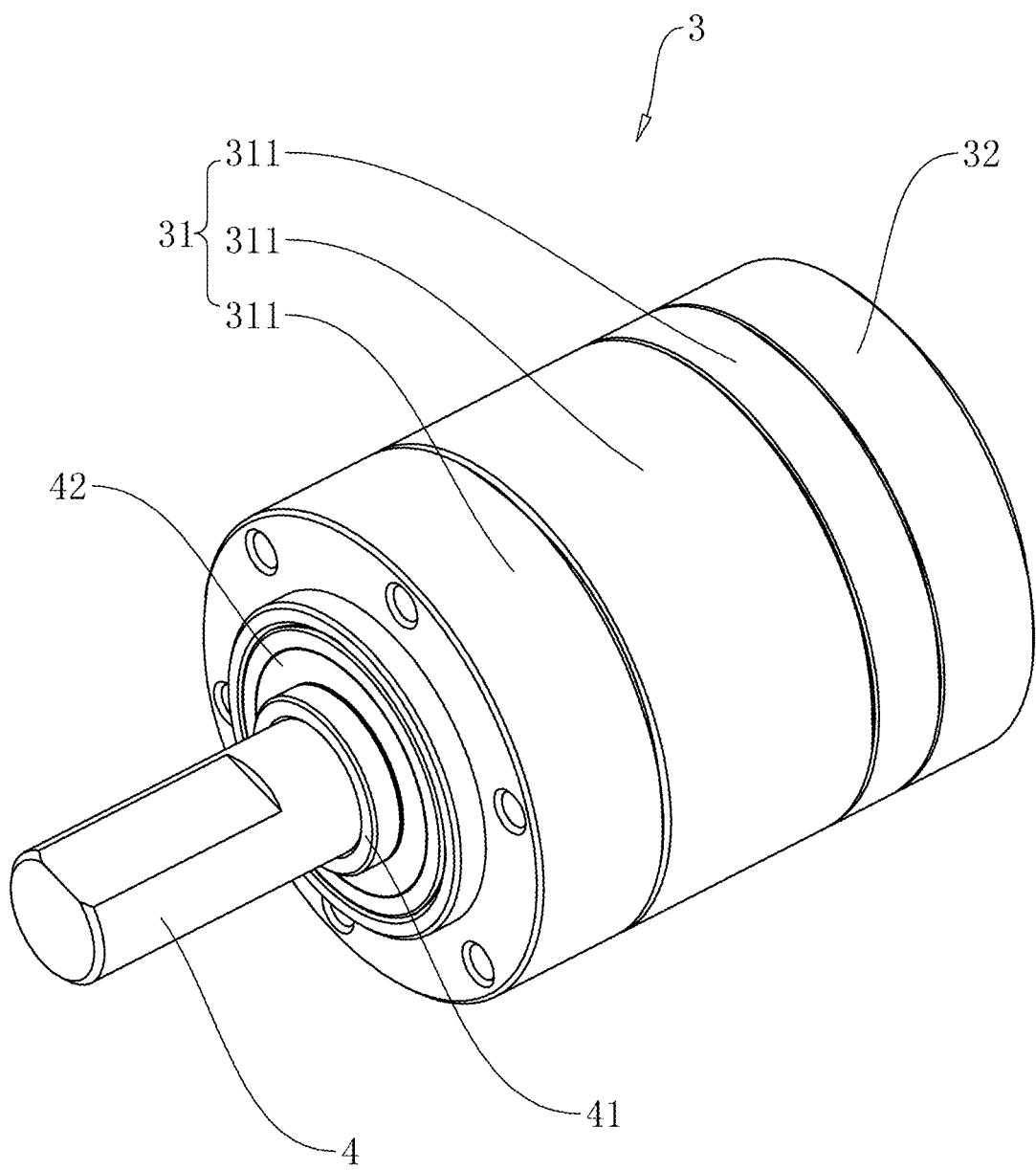
FIG. 7 is a schematic view showing the structure of another speed reducer according to Embodiment 3 of the present application.
Figure 8:
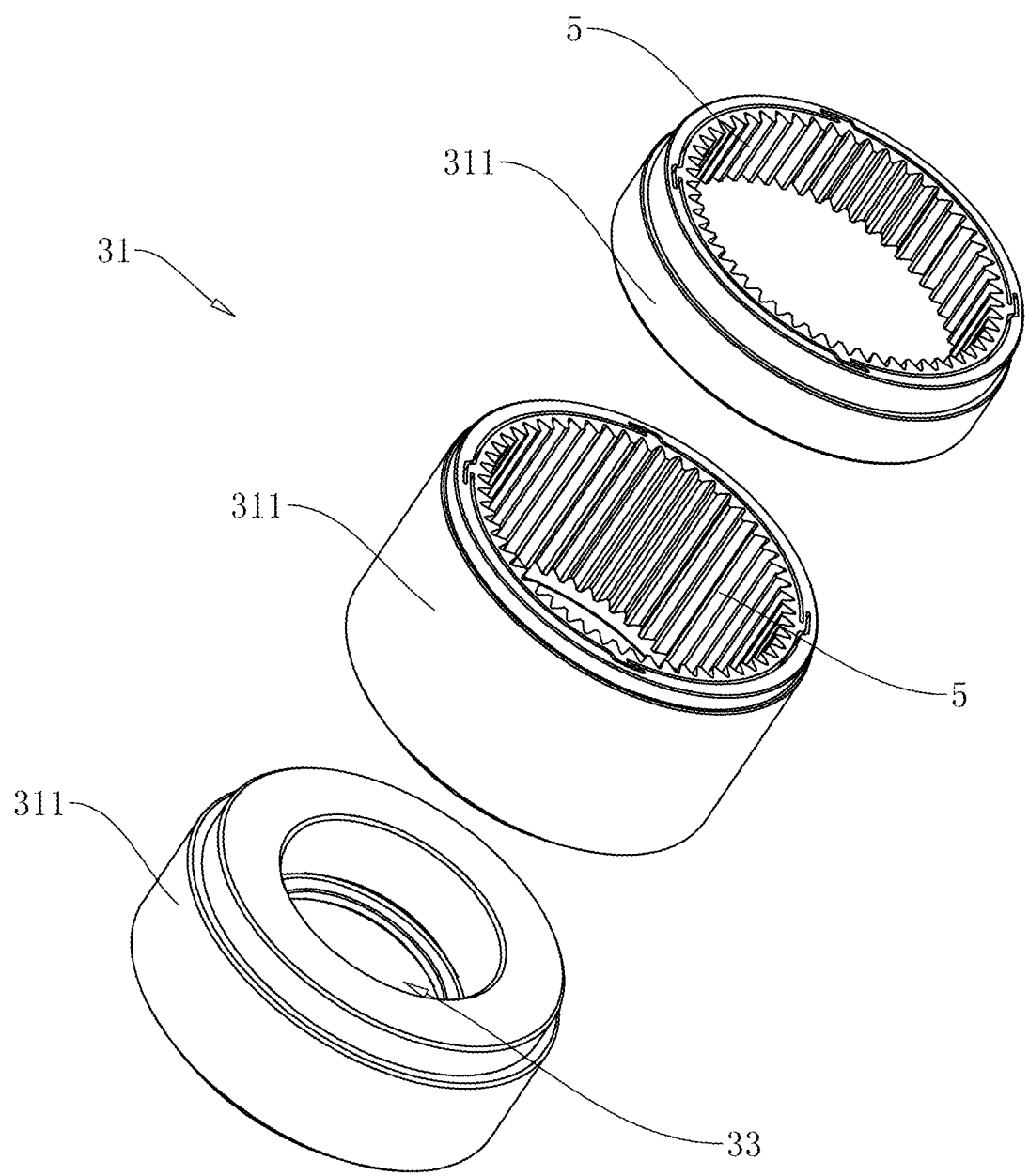
FIG. 8 is a schematic view showing the assembly relationship of a mounting cylinder according to Embodiment 4 of the present application.

Referring to FIGS. 6 and 7, the present embodiment differs from Embodiment 2 in that the mounting cylinder 31 includes a plurality of annular cylinder units 311 that are sequentially connected and fastened along the axial direction of the speed reducer to form a complete housing 3 of the speed reducer. Furthermore, the ring gear 5 is also correspondingly divided into a plurality of independent parts corresponding to the cylindrical units of the housing 3, and each part of the ring gear 5 is confined inside the corresponding cylindrical unit. This design not only simplifies the assembly process of the speed reducer and improves maintainability, but also allows each part of the ring gear 5 to be elastic deformable relatively independently when subjected to load or vibration, thereby enhancing the overall stability and durability of the speed reducer.

Embodiment 5

Figure 9:
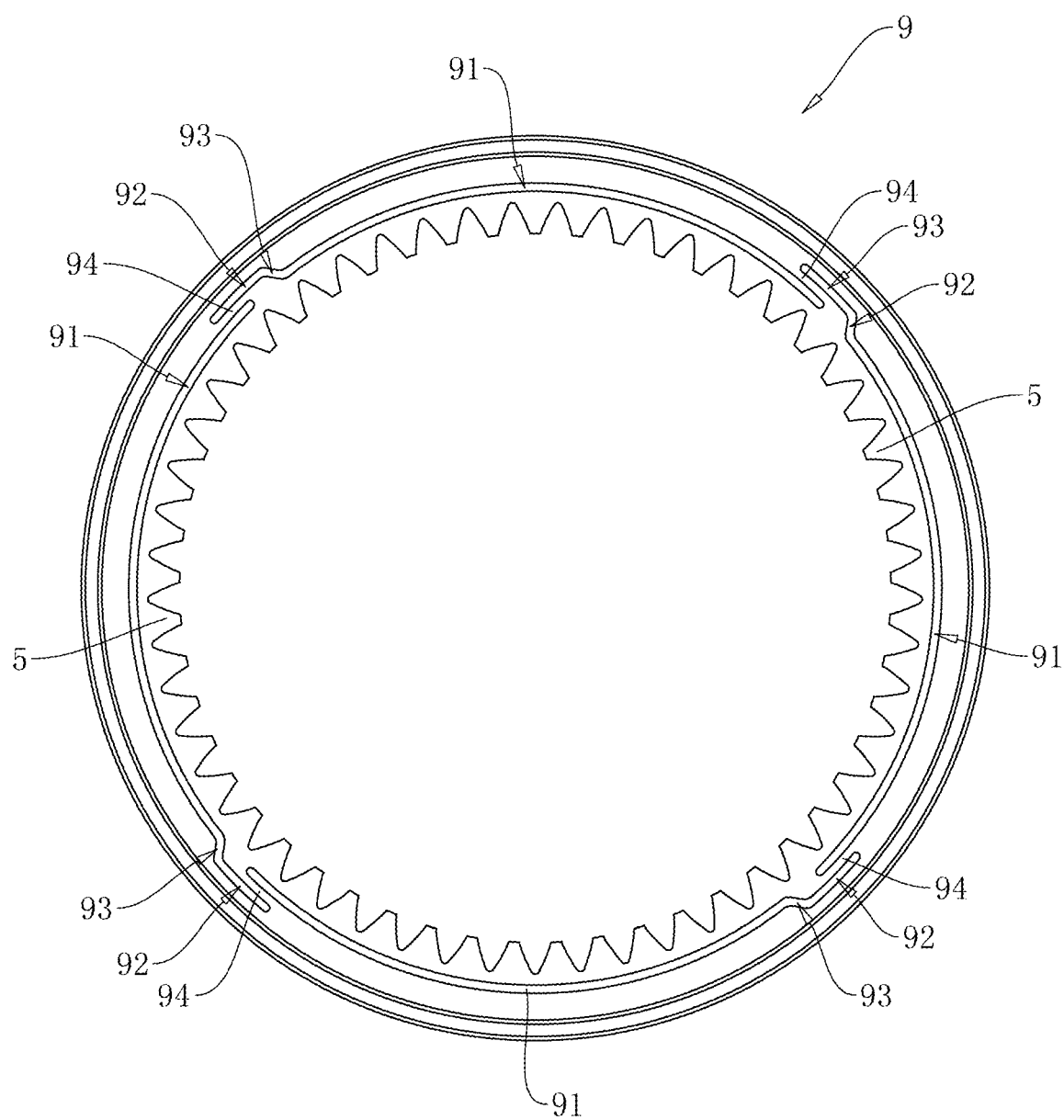
FIG. 9 is a schematic view showing the structure of an elastic groove according to Embodiment 5 of the present application.
Figure 10:
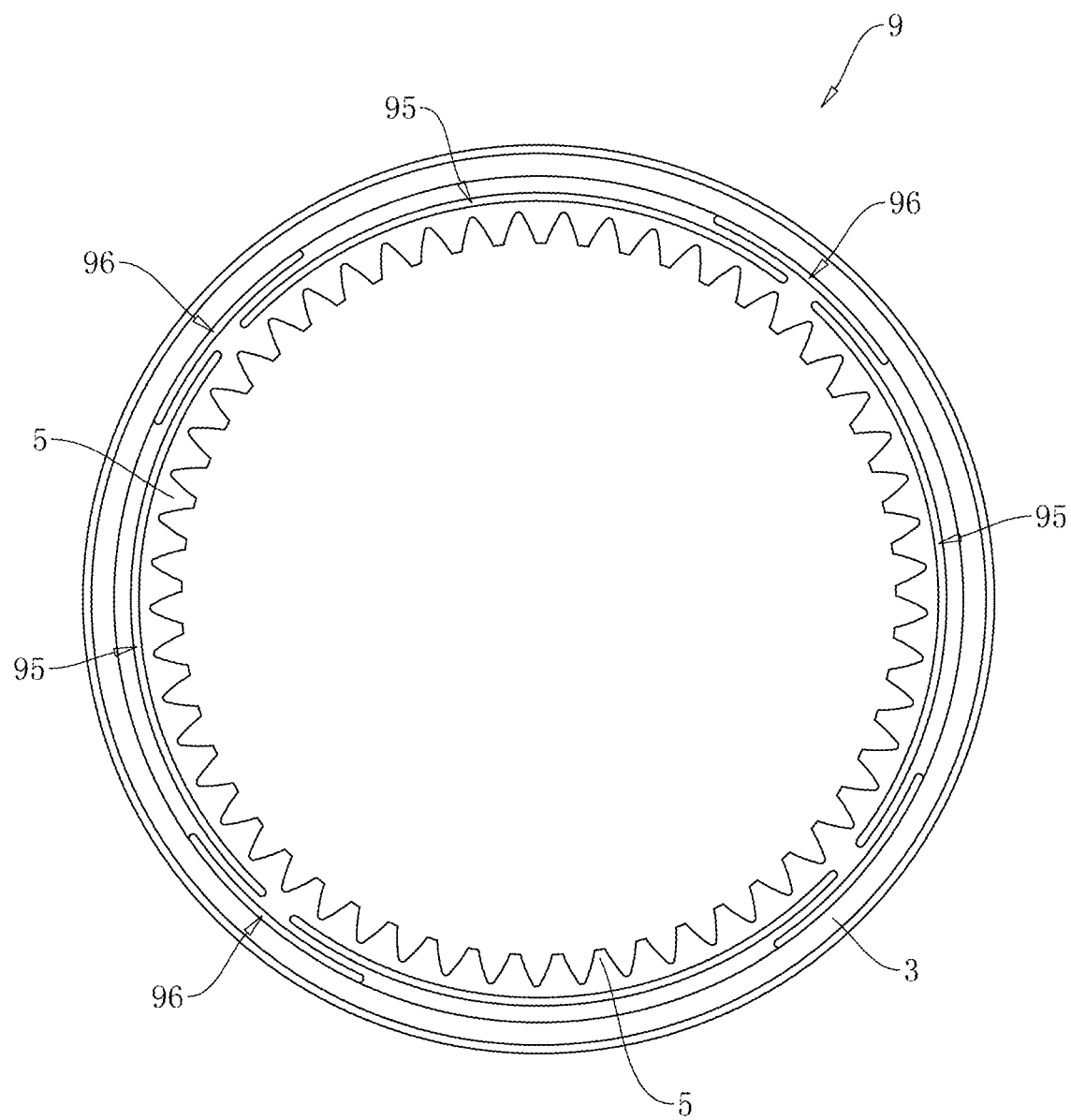
FIG. 10 is a schematic view showing the structure of an elastic groove according to Embodiment 6 of the present application.

Referring to FIG. 9, the difference between the present embodiment and Embodiment 3 is that an elastic groove 9 is provided between each ring gear 5 and the housing 3, and each elastic groove 9 is configured to be open at two ends along the axis of the housing 3 to ensure that the ring gear 5 may be elastically deformed during operation. A plurality of the elastic grooves 9 are provided, and the plurality of elastic grooves 9 are centrosymmetric in a circumferential direction. The elastic groove 9 includes a first arc-shaped section 91, a second arc-shaped section 92, and an inclined section 93, where the diameter of the first arc-shaped section 91 is larger than the diameter of the second arc-shaped section 92, and the length of the first arc-shaped section 91 is also larger than the length of the second arc-shaped section 92. One end of the inclined section 93 communicates with the end of the first arc-shaped section 91, and the other end of the inclined section 93 communicates with the end of the second arc-shaped section 92. A connecting portion 94 is formed between the adjacent first arc-shaped section 91 and the second arc-shaped section 92, one end of the connecting portion 94 is fixedly connected to the outer side wall of the ring gear 5, and the other end of the connecting portion 94 is fixedly connected to the inner side wall of the housing.

The implementation principle of the present embodiment is that the elastic groove 9 allows the ring gear 5 to be elastically deformed during operation, thereby further improving the stability and durability of the speed reducer. The centrosymmetric arrangement of the elastic grooves 9 in a circumferential direction ensures the uniformity of deformation, while the connecting portion 94 ensures a secure connection between the ring gear 5 and the housing 3.

Embodiment 6

The difference between the present embodiment and Embodiment 5 is that the elastic groove 9 of the present embodiment includes a plurality of fourth arc-shaped sections 95 and a plurality of fifth arc-shaped sections 96, and the fifth arc-shaped section 96 may have the same or different curvature radius as that of the fourth arc-shaped section 95. When the fifth arc-shaped section 96 has the same radius as the fourth arc-shaped section 95, the two are alternately arranged in the circumferential direction. When the radius of the fifth arc-shaped section 96 is larger than the radius of the fourth arc-shaped section 95, the plurality of fourth arc-shaped sections 95 and the plurality of fifth arc-shaped sections 96 are all uniformly arranged in the circumferential direction to enhance the overall elastic performance of the elastic groove 9.

The above-mentioned preferred embodiments of the present application do not limit the protection scope of the present application, and therefore: all equivalent variations in the structure, shape, and principles of the present application are intended to be within the scope of the present application.

LIST OF REFERENCE NUMERALS

1 fixed bracket
11 fixed block
12 connecting block
13 space region 14 central shaft hole
2 encircling elastic buffering device
21 elastic buffering unit
211 movable support
2111 shaft hole of planetary gear
212 elastic connecting arm
2121 first bent section
2122 second bent section
2123 third bent section
22 connection bridge
3 housing
31 mounting cylinder
311 annular cylinder unit
32 cover
33 bore
34 through hole
4 output shaft
41 fixing sleeve
42 ball bearing
43 corrugated gasket
5 ring gear
6 planetary gear system
61 first sun gear
62 first planetary gear
63 first gear shaft
65 second sun gear
66 second planetary gear
67 second gear shaft
64 connecting shaft
7 gasket of sun gear
8 gasket of cover
9 elastic groove
91 first arc-shaped section
92 second arc-shaped section
93 inclined section
94 connecting portion
95 fourth arc-shaped section
96 fifth arc-shaped section

What is claimed is:

1. An elastic buffering planet carrier, comprising a fixed bracket and an encircling elastic buffering device, wherein the fixed bracket is mounted inside the encircling elastic buffering device, the fixed bracket is configured with a central shaft hole for guiding an output shaft to axially pass through the fixed bracket, a plurality of shaft holes of planetary gear are evenly distributed at the encircling elastic buffering device, the plurality of shaft holes of planetary gear are configured for gear shafts to respectively pass through, and the encircling elastic buffering device is elastically deformable in a transverse direction, a longitudinal direction and arbitrary oblique direction, wherein the encircling elastic buffering device comprises a plurality of elastic buffering units, every two adjacent elastic buffering units of the plurality of elastic buffering units are fixedly connected by a connection bridge, the fixed bracket is fixedly connected with the plurality of connection bridges simultaneously, and each of the plurality of elastic buffering units is elastically deformable in the transverse direction, the longitudinal direction and the arbitrary oblique direction, wherein each of the plurality of elastic buffering units comprises a movable support and two elastic connecting arms, the movable support is positioned between the two elastic connecting arms, a first end of each of the two elastic connecting arms is fixedly connected to the connection bridge, a second end of each of the two elastic connecting arms is fixed to one end of the movable support, the two elastic connecting arms are flexibly bendable in the transverse direction, the longitudinal direction and the arbitrary oblique direction, and the plurality of shaft holes of planetary gear are configured at the movable support, and wherein each of the two elastic connecting arms comprises a first bent section, a second bent section and a third bent section, a first end of the first bent section is connected to the connection bridge, a second end of the first bent section is connected to a first end of the second bent section, a second end of the second bent section is connected to a first end of the third bent section, and a second end of the third bent section is connected to the movable support.

2. The elastic buffering planet carrier according to claim 1, wherein at least one of the first bent section, the second bent section, or the third bent section is of an arc-shaped structure or a U-shaped structure or an S-shaped structure or a V-shaped structure or a C-shaped structure.

3. A speed reducer, comprising a housing, at least one elastic buffering planet carrier according to claim 1 and at least one planetary gear system, wherein a ring gear is provided inside the housing, the at least one elastic buffering planet carrier is provided inside the housing, the at least one elastic buffering planet carrier is fixedly connected with other parts of the speed reducer, the at least one planetary gear system is fixedly connected or rotatably connected with a power input component of the speed reducer, and the at least one planetary gear system and the ring gear are linked with each other.

4. The speed reducer according to claim 3, wherein elastic grooves are defined between the ring gear and the housing, and each of the elastic grooves is configured to be open at two ends of each of the elastic grooves along an axis of the housing to ensure that the ring gear is elastically deformable during operation.

5. An elastic buffering planet carrier, comprising a fixed bracket and an encircling elastic buffering device, wherein the fixed bracket is mounted inside the encircling elastic buffering device, the fixed bracket is configured with a central shaft hole for guiding an output shaft to axially pass through the fixed bracket, a plurality of shaft holes of planetary gear are evenly distributed at the encircling elastic buffering device, the plurality of shaft holes of planetary gear are configured for gear shafts to respectively pass through, and the encircling elastic buffering device is elastically deformable in a transverse direction, a longitudinal direction and arbitrary oblique direction, wherein the encircling elastic buffering device comprises a plurality of elastic buffering units, every two adjacent elastic buffering units of the plurality of elastic buffering units are fixedly connected by a connection bridge, the fixed bracket is fixedly connected with the plurality of connection bridges simultaneously, and each of the plurality of elastic buffering units is elastically deformable in the transverse direction, the longitudinal direction and the arbitrary oblique direction, wherein each of the plurality of elastic buffering units comprises a movable support and two elastic connecting arms, the movable support is positioned between the two elastic connecting arms, a first end of each of the two elastic connecting arms is fixedly connected to the connection bridge, a second end of each of the two elastic connecting arms is fixed to one end of the movable support, the two elastic connecting arms are flexibly bendable in the transverse direction, the longitudinal direction and the arbitrary oblique direction, and the plurality of shaft holes of planetary gear are configured at the movable support, wherein the fixed bracket comprises a fixed block and a plurality of connecting blocks, the central shaft hole is configured at the fixed block, the plurality of connecting blocks are distributed in a circumferential direction of the fixed block, a first end of each of the plurality of connecting blocks is fixedly connected to the fixed block, and a second end of each of the plurality of connecting blocks is fixedly connected to the connection bridge, and wherein the fixed block, every two adjacent connecting blocks of the plurality of connecting blocks and a respective one of the plurality of elastic buffering units together form a space region allowing an elastic deformation of the respective one of the plurality of elastic buffering units.

\* \* \* \* \*